US012664743B2

(12) United States Patent
Zhou et al.

(10) Patent No.: US 12,664,743 B2
(45) Date of Patent: Jun. 23, 2026

(54) DATA PROCESSING METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Chao Zhou, Beijing (CN); Fengwei Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 103 days.

(21) Appl. No.: 18/393,579

(22) Filed: Dec. 21, 2023

(65) Prior Publication Data

US 2024/0144625 A1 May 2, 2024

Related U.S. Application Data

(63) Continuation of application No. PCT/CN2022/114298, filed on Aug. 23, 2022.

(30) Foreign Application Priority Data

Sep. 7, 2021 (CN) .......................... 202111044347.2

(51) Int. Cl.
G06T 19/00 (2011.01)
G06T 7/20 (2017.01)
(Continued)

(52) U.S. Cl.
CPC ............... *G06T 19/20* (2013.01); *G06T 7/20* (2013.01); *G06T 7/70* (2017.01); *G06T 2219/2016* (2013.01)

(58) Field of Classification Search
None
See application file for complete search history.

(56) References Cited

U.S. PATENT DOCUMENTS 10,664,903 B1 * 5/2020 Haitani ................ G02B 27/017
10,953,334 B2 * 3/2021 Kolen ...................... A63F 13/63
(Continued)

FOREIGN PATENT DOCUMENTS

CN 101685515 A 3/2010
CN 103150761 A 6/2013
(Continued)

OTHER PUBLICATIONS

An et al., "ARShoe: Real-Time Augmented Reality Shoe Try-on System on Smartphones", ARVIX.org, Cornell University Library, Aug. 24, 2021, 10 pages.
(Continued)

*Primary Examiner* — Martin Mushambo
(74) *Attorney, Agent, or Firm* — Astute IP Law Group

(57) ABSTRACT

A data processing method, a data processing apparatus, an electronic device, and a computer-readable storage medium are provided. The data processing method includes: in response to an operation of importing a resource file of an object to be tried on, performing processing on the resource file and obtaining a target file in a file format adapted to an effect editor; adding a rendering component to a preset node of the effect editor in response to an operation of dragging the target file to the preset node; and rendering, based on the rendering component, a try-on image in which a model of the object to be tried on is tried on a model of a preset part.

20 Claims, 3 Drawing Sheets

In response to an operation of importing a resource file of an object to be tried on, performing processing on the resource file and obtaining a target file in a file format adapted to an effect editor ⟋ 110

Adding a rendering component to a preset node of the effect editor in response to an operation of dragging the target file to the preset node of the effect editor ⟋ 120

Rendering, based on the rendering component, a try-on image in which a model of the object to be tried on is tried on a model of a preset part ⟋ 130

(51) Int. Cl.
*G06T 7/70* (2017.01)
*G06T 19/20* (2011.01)

(56) References Cited

U.S. PATENT DOCUMENTS

| | | | | |
|---|---|---|---|---|
| 11,145,138 | B2 * | 10/2021 | Grant | G06T 3/403 |
| 2012/0306919 | A1 * | 12/2012 | Suzuki | G06V 40/103 |
| | | | | 345/633 |
| 2013/0215116 | A1 | 8/2013 | Siddique et al. | |
| 2014/0325349 | A1 | 10/2014 | Riherd et al. | |
| 2016/0267576 | A1 * | 9/2016 | Crossman Sullivan | |
| | | | | G06Q 30/0643 |
| 2020/0065991 | A1 * | 2/2020 | Chu | G06T 7/33 |
| 2020/0286160 | A1 * | 9/2020 | Bruch | G06Q 30/0643 |
| 2020/0306640 | A1 * | 10/2020 | Kolen | A63F 13/67 |
| 2020/0402147 | A1 * | 12/2020 | Lin | G06F 3/0482 |
| 2021/0224886 | A1 | 7/2021 | Fu | |
| 2022/0258049 | A1 * | 8/2022 | Kanani | G06Q 30/0621 |

FOREIGN PATENT DOCUMENTS

| | | | |
|---|---|---|---|
| CN | 104978762 | A | 10/2015 |
| CN | 110348972 | A | 10/2019 |
| CN | 111369686 | A | 7/2020 |
| CN | 111428165 | A | 7/2020 |
| CN | 112927312 | A | 6/2021 |
| CN | 111383329 | B | 7/2023 |
| GB | 2536060 | A | 9/2016 |
| JP | 2003228599 | A | 8/2003 |
| JP | 2017189181 | A | 10/2017 |
| JP | 2020525932 | A | 8/2020 |
| WO | 2020203656 | A1 | 10/2020 |

OTHER PUBLICATIONS

Extended European Search Report for European Patent Application No. 22866405.8, mailed on Aug. 8, 2024, 13 pages.

Office Action for Japanese Patent Application No. 2023-579026, mailed on Dec. 10, 2024, 10 pages.

Office Action for Japanese Patent Application No. 2023-579026, mailed on Jun. 3, 2025, 6 pages.

Office Action for Chinese Patent Application No. 202111044347.2, mailed on Feb. 12, 2026, 15 pages.

* cited by examiner

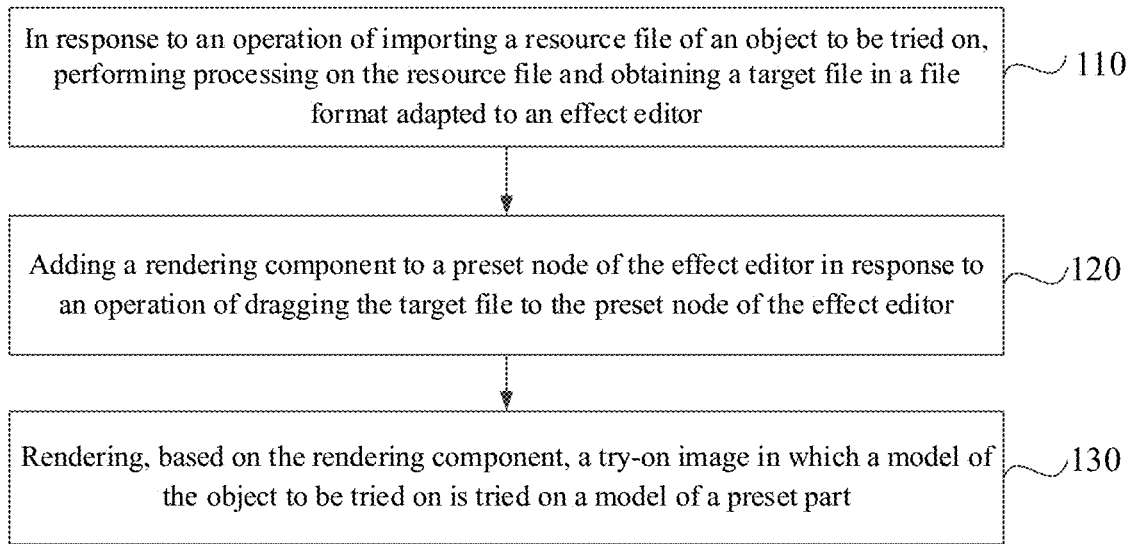

In response to an operation of importing a resource file of an object to be tried on, performing processing on the resource file and obtaining a target file in a file format adapted to an effect editor ⌐∼⌐ 110

Adding a rendering component to a preset node of the effect editor in response to an operation of dragging the target file to the preset node of the effect editor ⌐∼⌐120

Rendering, based on the rendering component, a try-on image in which a model of the object to be tried on is tried on a model of a preset part ⌐∼⌐130

FIG. 1

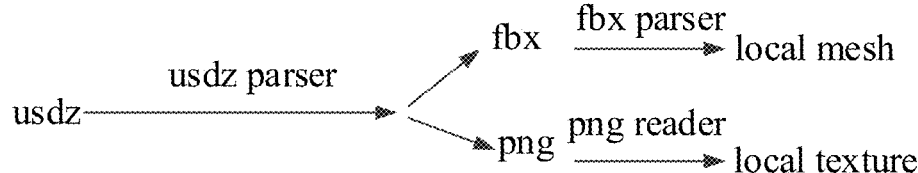

FIG. 2

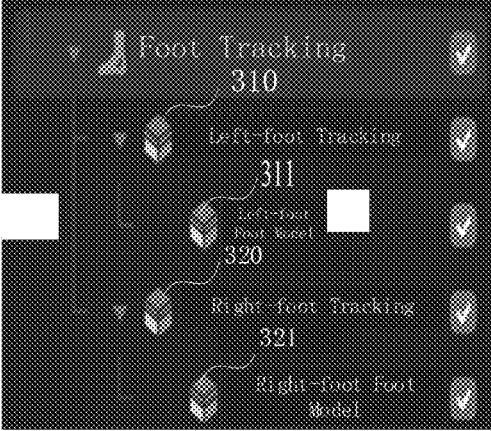

| Processing Module | First Adding Module | Rendering Module |

DATA PROCESSING METHOD AND APPARATUS, AND ELECTRONIC DEVICE AND STORAGE MEDIUM

CROSS REFERENCE TO RELATED APPLICATIONS

The present application is a continuation of International Patent Application No. PCT/CN2022/114298, filed on Aug. 23, 2022, which claims priority of Chinese Patent Application No. 202111044347.2, filed on Sep. 7, 2021. All the aforementioned patent applications are hereby incorporated by reference in their entireties.

TECHNICAL FIELD

The present disclosure relates to the field of information technology, and in particular to a data processing method, a data processing apparatus, an electronic device, and a storage medium.

BACKGROUND

With the continuous development of augmented reality technology, device users may apply application programs on electronic devices, such as terminals, to realize virtual try-on effects, for example, trying on shoes, clothes, jewelry, etc., so as to enable the device users to choose their own satisfactory products without leaving home.

However, at present, the process of realizing a virtual try-on function is relatively complicated.

SUMMARY

In order to solve the above technical problems or at least partially solve the above technical problems, embodiments of the present disclosure provide a data processing method, a data processing apparatus, an electronic device, and a storage medium, which can achieve a virtual try-on on a trial object.

In the first aspect, the embodiments of the present disclosure provide a data processing method, which is applied to an effect editor, and the method includes:

in response to an operation of importing a resource file of an object to be tried on, performing processing on the resource file and obtaining a target file in a file format adapted to an effect editor;

adding a rendering component to a preset node of the effect editor in response to an operation of dragging the target file to the preset node; and rendering, based on the rendering component, a try-on image in which a model of the object to be tried on is tried on a model of a preset part.

In the second aspect, the embodiments of the present disclosure further provide a data processing apparatus, and the apparatus includes:

a processing module, configured to, in response to an operation of importing a resource file of an object to be tried on, perform processing on the resource file and obtain a target file in a file format adapted to an effect editor;

a first adding module, configured to add a rendering component to a preset node of the effect editor in response to an operation of dragging the target file to the preset node; and a rendering module, configured to render, based on the rendering component, a try-on image in which a model of the object to be tried on is tried on a model of a preset part.

In the third aspect, the embodiments of the present disclosure further provide an electronic device and the electronic device includes:

one or more processors, and a storage apparatus for storing one or more programs; and the one or more programs, when executed by the one or more processors, cause the one or more processors to implement the data processing method according to the above.

In the fourth aspect, the embodiments of the present disclosure further provide a computer-readable storage medium storing a computer program, and the computer program, when executed by a processor, causes the processor to implement the data processing method according to the above.

The technical solutions provided by the embodiments of the present disclosure have at least the following advantages over the existing technology:

the data processing method provided by the embodiments of the present disclosure includes: in response to an operation of importing a resource file of an object to be tried on, performing processing on the resource file and obtaining a target file in a file format adapted to an effect editor; adding a rendering component to a preset node of the effect editor in response to an operation of dragging the target file to the preset node; and rendering, based on the rendering component, a try-on image in which a model of the object to be tried on is tried on a model of a preset part. That is, a user only needs to import the resource file of the object to be tried on to the effect editor, the effect editor may automatically perform parsing and format conversion on the resource file to obtain the target file adapted to the effect editor, then the user drags the target file to the preset node of the effect editor, and the effect editor may automatically add the rendering component for the preset node and render the try-on image in which the model of the object to be tried on is tried on the model of the preset part, thereby achieving the virtual try-on of the object to be tried on and simplifying the user operation.

BRIEF DESCRIPTION OF THE DRAWINGS

The above and other features, advantages, and aspects of the embodiments of the present disclosure will become more apparent with reference to the accompanying drawings and the following specific implementations. Throughout the accompanying drawings, identical or similar reference numerals represent identical or similar elements. It should be understood that, the accompanying drawings are schematic, and components and elements are not necessarily drawn to scale.

FIG. 1 is a flowchart of a data processing method according to an embodiment of the present disclosure;

FIG. 2 shows processing of a resource file according to an embodiment of the present disclosure;

FIG. 3 is a schematic diagram of a left-foot node and a right-foot node according to an embodiment of the present disclosure;

DETAILED DESCRIPTION

Figure 4:
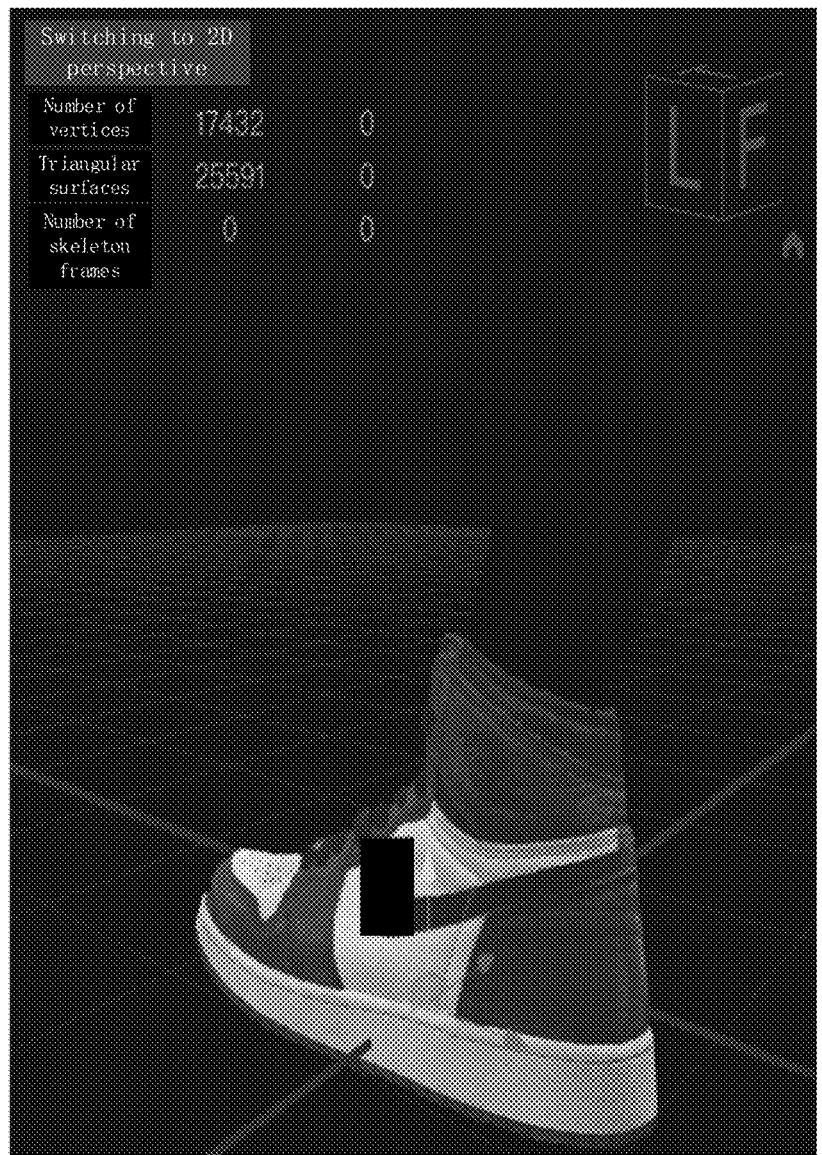
FIG. 4 is a schematic diagram of a virtual try-on effect according to an embodiment of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method implementations of the present disclosure may be performed in different orders and/or in parallel. Furthermore, the method implementations may include additional steps and/or omit performing the illustrated steps. The protection scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

FIG. 1 is a flowchart of a data processing method according to an embodiment of the present disclosure. The method may be performed by a data processing apparatus. The apparatus may be implemented using software and/or hardware. The apparatus may be configured in an electronic device, such as a display terminal, specifically including, but not limited to, a smartphone, a personal digital assistant (PDA), a tablet PC, a portable wearable device, a smart home device (e.g., a table lamp), and other electronic devices having displays.

As illustrated in FIG. 1, the method may specifically include the following steps.

Step 110, in response to an operation of importing a resource file of an object to be tried on, performing processing on the resource file and obtaining a target file in a file format adapted to an effect editor.

For example, the resource file of the object to be tried on is a file in a three-dimensional (3D) format obtained by tracking a physical entity of the object to be tried on based on a 3D object tracking device. The 3D object tracking device refers to a device that runs a 3D object tracking algorithm. The 3D object tracking algorithm is a commonly used algorithm in computer vision, which is widely used in the fields such as video surveillance, human-computer interaction, self-driving vehicles, etc.

The resource file of the object to be tried on refers to a file storing related resources of a 3D model of the object to be tried on. The 3D model of the object to be tried on and related resources (e.g., a texture-mapping resource) are obtained by the 3D object tracking algorithm, so that the efficiency of obtaining the 3D model is improved, the difficulty in obtaining the 3D model is reduced, and the labor cost of modeling is saved.

Taking the object to be tried on being shoes as an example, the 3D object tracking device tracks a left-foot shoe and a right-foot shoe respectively to obtain a resource file of a left-foot model and a resource file of a right-foot model both in a 3D format. The resource file in the 3D format is usually a "usdz" file. The "usdz" is a file format for augmented reality on the ios platform for 3D information service. The "usdz" file itself can act as a container which contains a large number of tools required for a computer to open the format to properly display its contents. In other words, the "usdz" file is a resource base for implementing 3D rendering. The resource file of the left-foot model and the resource file of the right-foot model include a texture-mapping resource of the shoes, in addition to the 3D model of the shoes. Texture mapping is a graphic term that refers to a texture resource used in rendering of a 3D model. Patterns, colors and the like can be drawn on the 3D model with use of the textures, and the rugged texture in the details of the 3D model can also be simulated. Briefly, the user may use the 3D object tracking device to acquire a left-foot "usdz" file and a right-foot "usdz" file which are with resources such as the shoe models, textures, etc.

After obtaining the "usdz" file, the user simply needs to import the file into the effect editor. When the effect editor detects the operation of importing the "usdz" file by the user, the effect editor performs automatic parsing and format conversion on the imported "usdz" file to obtain a target file in a file format or data format adapted to the effect editor. The "usdz" file may be regarded as a compressed file of multiple resources. After decompression, the texture-mapping resource and the model resource within it can be obtained, that is, extraction of subdivided resources is completed. The model resource has its own data structure. The ios system itself supports opening the "usdz" file and exporting the "usdz" file as an "obj" file. There is also a third-party executable program that supports exporting the "usdz" file to an "fbx" file. For model files in common formats (e.g., "obj" and "fbx"), an official file parsing program library is provided. Therefore, model files in specified formats can be parsed according to interfaces provided by the file parsing program library, so as to extract model detail data such as vertex positions, texture coordinates, and normal vectors of the 3D model, so that new data structures can be constructed based on the extracted model detail data to match model resource objects of different engines. When the user imports the resource file of the object to be tried on to the effect editor, the effect editor can determine the file format of the resource file according to the suffix of the resource file, and then parse the resource file correspondingly using the interface provided by the corresponding file parsing program library to extract the model detail data therein. For example, a "usdz" parsing library and an "fbx" parsing library of a third party may be integrated in the effect editor. When the resource file imported by the user is a "usdz" file, the effect editor first converts the "usdz" file to an "fbx" file based on the "usdz" parsing library, then performs a parsing operation on the "fbx" file based on the "fbx" parsing library to extract model detail data therein, and then constructs a data structure adapted to the effect editor based on the extracted model detail data. The final representation includes the model file and texture-mapping file adapted to the effect editor. The entire process only requires the user to import the resource file, and does not require the user to participate in operations of file parsing and format conversion, thereby achieving the purpose of simplifying the operation of the user.

In summary, performing processing on the resource file and obtaining the target file in the file format adapted to the effect editor includes:

converting, based on a first preset file parsing-program-table interface, the file format of the resource file to a first format and obtaining the resource file in the first format, that is, converting the "usdz" file to the "fbx" file based on the "usdz" parsing library; parsing, based on a second preset file parsing-program-table interface, the resource file in the first format and obtaining at least two key points of a resource object included in the resource file in the first format, that is, extracting model detail data from the "fbx" file based on the "fbx" parsing library; and generating, based on the at least two key points, the target file in the file format adapted to the effect editor, the target file including a texture mapping sub-file of the object to be tried on and a model sub-file of the object to be tried on.

Correspondingly, referring to a schematic diagram of a process of performing processing on a resource file and obtaining a target file in a file format adapted to the effect editor as shown by FIG. 2, the resource file imported by the user is a "usdz" file, and the effect editor converts the "usdz" file into an "fbx" file (i.e., a model file) and a "png" file (a texture-mapping file) based on a "usdz" parsing library, i.e., a "usdz" parser, extracts the model detail data from the "fbx" file based on an "fbx" file parsing library, i.e., a "fbx" parser and constructs it into a local model structure mesh adapted to the effect editor, and finally, converts the resource in the "png" file to a local resource texture adapted to the effect editor based on a "png" parsing library, i.e., a "png" reader. The mesh is a common structure of the 3D model, and a surface of the 3D model is usually composed of a plurality of triangular surfaces connected to each other. Each triangular surface consists of three nodes and three edges. Therefore, the 3D model may be interpreted as being composed of nodes and edges, and the mesh refers to the set of nodes and edges that construct the 3D model.

Step 120, adding a rendering component to a preset node of the effect editor in response to an operation of dragging the target file to the preset node of the effect editor.

For example, adding the rendering component to the preset node of the effect editor in response to the operation of dragging the target file to the preset node of the effect editor includes:

loading the rendering component, which is already set, to the preset node and passing the model sub-file into the rendering component, so as to establish a reference relationship between the rendering component and the model sub-file; creating a sub-node of a preset material resource file and establishing a reference relationship between the preset material resource file and the rendering component; and establishing a reference relationship between the texture mapping sub-file and the preset material resource file in response to an operation of dragging the texture mapping sub-file to the sub-node of the preset material resource file.

That is, the rendering component needs to reference two resources, namely, a model resource (i.e., the model sub-file) and a material resource (i.e., the preset material resource file). When the user drags the target file to the preset node of the effect editor, the effect editor automatically adds the rendering component to the preset node, and transfers the model sub-file to the rendering component as a referenced resource of the rendering component, and the effect editor also creates a sub-node of the preset material resource file, and at this time, it is necessary for the user to drag the texture-mapping sub-file to the sub-node, so as to establish the reference relationship between the texture-mapping sub-file and the preset material resource file. The rendering effect of the 3D model is determined by the material resource referenced by the rendering component, and the effect editor provides a PBR material, that is, the preset material resource may be a PBR material. The PBR material may be configured to achieve various physical effects of such as the metal ball, textiles, wood product, or the like, for example, including the texture of shoes.

Step 130, rendering, based on the rendering component, a try-on image in which a model of the object to be tried on is tried on a model of a preset part.

Taking the object to be tried on being shoes as an example to illustrate the above process, the user uses the 3D object tracking device to acquire a left-foot "usdz" file and a right-foot "usdz" file with resources such as shoe models and textures, and the user imports the left-foot "usdz" file and the right-foot "usdz" file to the effect editor respectively, so that the effect editor performs processing on the left-foot "usdz" file to obtain a left-foot target file and performs processing on the right-foot "usdz" file to obtain a right-foot target file. Then, the user drags the left-foot target file to a left-foot node of the effect editor and drags the right-foot target file to a right-foot node of the effect editor. The effect editor adds rendering components to the left-foot node and the right-foot node, respectively, and further establishes a reference relationship between the rendering component of the left-foot node and the left-foot model sub-file, as well as establishes a reference relationship between the rendering component of the right-foot node and the right-foot model sub-file. Also while a PBR material resource corresponding to the left-foot node and a PBR material resource corresponding to the right-foot node are respectively created, the user drags the left-foot texture-mapping sub-file to the PBR material resource corresponding to the left-foot node, so as to establish a reference relationship between the PBR material resource corresponding to the left-foot node and the left-foot texture-mapping sub-file; and the user drags the right-foot texture-mapping sub-file to the PBR material resource corresponding to the right-foot node, so as to establish a reference relationship between the PBR material resource corresponding to the right-foot node and the right-foot texture-mapping sub-file. For example, referring to a schematic diagram of a left-foot node and a right-foot node shown by FIG. 3, it includes a left-foot node 310, a left-foot model 311, a right-foot node 320, and a right-foot model 321. In summary, the user only needs to drag the resource files corresponding to shoes to the corresponding nodes, so as to see a virtual try-on image of the shoes, which facilitates user operation and allows the user to quickly create virtual try-on effects of the physical shoes around the user, thereby lowering the operation difficulty.

In some implementations, the data processing method further includes: in response to the operation of dragging the target file to the preset node of the effect editor, adding a position-posture component to the preset node and establishing a reference relationship between the position-posture component and a preset foot-detection algorithm, so as to allow a foot position and a foot posture, which are determined based on the preset foot-detection algorithm, to be transferred to the position-posture component, where the preset foot-detection algorithm is configured to determine the foot position and the foot posture based on a video frame, and the position-posture component is configured to provide a rendering position during rendering. For example, if the try-on part is no longer a fixed foot model but a user's foot captured in real time by a camera, the position-posture component is required to provide the rendering position of the 3D shoe model according to the preset foot-detection algorithm.

In some implementations, in order to achieve a realistic virtual try-on effect and improve the fitness between the shoe model and the foot model, it is necessary to align the coordinate origin of the shoe model with the coordinate origin of the foot model. Specifically, rendering, based on the rendering component, the try-on image in which the model of the object to be tried on is tried on the model of the preset part includes: performing correction, based on a coordinate origin applied in the preset foot-detection algorithm, on a coordinate origin of a shoe model to adjust a fitness between the shoe model and a foot model. For example, based on the thousands of vertex data of a 3D shoe model, a cuboid contour capable of enclosing the 3D shoe model may be determined; based on a ratio between the cuboid contour of the 3D shoe model and the cuboid contour of the foot model, a multiple by which the 3D shoe model should be scaled is determined; and further, based on an offset of the cuboid contour of the 3D shoe model relative to the coordinate origin, a position at which the 3D shoe model should be corrected is determined, and the position is provided to the position-posture component to render the 3D shoe model that is adapted to fit the size of the foot model, thereby improving the fitness between the 3D shoe model and the foot model.

In some implementations, in order to further achieve the realistic virtual try-on effect, the effect editor is integrated with a leg model for providing an obscuring relationship during rendering, thus making the virtual try-on effect more realistic. Specifically, the method further includes adding a leg model to the preset node in response to the operation of dragging the target file to the preset node of the effect editor, and the leg model is configured to provide an obscuring relationship during rendering. For example, with reference to a schematic diagram of a virtual try-on effect as shown in FIG. 4, it includes an effect of obscuring the leg realized by the leg model, so as to achieve a more realistic virtual try-on effect.

In some implementations, in order to realize the virtual try-on function at a client terminal, the method further includes: generating, based on the preset node, a try-on effect file package, and the try-on effect file package includes at least one of following: a texture mapping sub-file of shoes, a model sub-file of shoes, a material resource file, a leg model, a rendering component, a position-posture component, or a reference relationship between the rendering component and respective files. For example, the material resource file references the texture-mapping sub-file, the rendering component references the model sub-file and the material resource file, and the position-posture component references the foot-detection algorithm. The method further includes: uploading the try-on effect file package to a server, so as to allow the server to cooperate with a client terminal to achieve a virtual try-on function at the client terminal based on the try-on effect file package. Specifically, when virtual try-on is performed at the client terminal, the foot position and foot posture of the user are acquired in real time by the position-posture component, and the rendering component renders the 3D model of the shoes according to the foot position and foot posture of the user.

According to the data processing method provided by the embodiments of the present disclosure, the user only needs to import the resource file of the object to be tried on to the effect editor, the effect editor may automatically perform parsing and format conversion on the resource file to obtain the target file adapted to the effect editor, then the user drags the target file to the preset node of the effect editor, and the effect editor may automatically add the rendering component for the preset node and render the try-on image in which the model of the object to be tried on is tried on the model of the preset part, thereby achieving the virtual try-on of the object to be tried on and simplifying the operation of the user.

Figure 5:
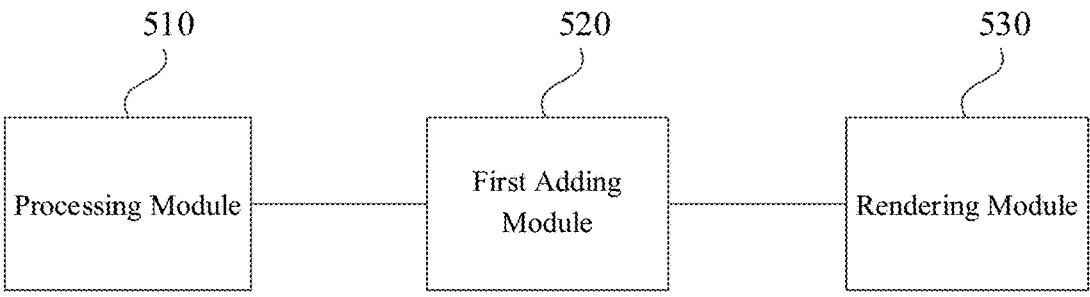
FIG. 5 is a schematic structural diagram of a data processing apparatus according to an embodiment of the present disclosure.

FIG. 5 is a schematic structural diagram of a data processing apparatus according to an embodiment of the present disclosure. As illustrated in FIG. 5, the data processing apparatus specifically includes a processing module 510, a first adding module 520, and a rendering module 530.

The processing module 510 is configured to, in response to an operation of importing a resource file of an object to be tried on, perform processing on the resource file and obtain a target file in a file format adapted to an effect editor. The first adding module 520 is configured to add a rendering component to a preset node of the effect editor in response to an operation of dragging the target file to the preset node. The rendering module 530 is configured to render, based on the rendering component, a try-on image in which a model of the object to be tried on is tried on a model of a preset part.

Optionally, the resource file of the object to be tried on is a file in a three-dimensional (3D) format obtained by tracking a physical entity of the object to be tried on based on a 3D object tracking device.

Optionally, the processing module 510 includes: a conversion unit, configured to convert, based on a first preset file parsing-program-table interface, the file format of the resource file to a first format and obtain the resource file in the first format; a parsing unit, configured to parse, based on a second preset file parsing-program-table interface, the resource file in the first format and obtain at least two key points of a resource object included in the resource file in the first format; and a generating unit, configured to generate, based on the at least two key points, the target file in the file format adapted to the effect editor, the target file including a texture mapping sub-file of the object to be tried on and a model sub-file of the object to be tried on.

Optionally, the first adding module 520 includes: a loading unit, configured to load the rendering component, which is already set, to the preset node and pass the model sub-file into the rendering component, so as to establish a reference relationship between the rendering component and the model sub-file; a creating unit, configured to create a sub-node of a preset material resource file and establish a reference relationship between the preset material resource file and the rendering component; and an establishing unit, configured to establish a reference relationship between the texture mapping sub-file and the preset material resource file in response to an operation of dragging the texture mapping sub-file to the sub-node of the preset material resource file.

Optionally, the object to be tried on includes shoes, and the model of the object to be tried on includes a left-foot shoe model and a right-foot shoe model, and the model of the preset part includes a left-foot foot model and a right-foot foot model; and the resource file includes a left-foot resource file and a right-foot resource file, and the target file includes a left-foot target file and a right-foot target file.

Optionally, the first adding module 520 is specifically configured to add a rendering component to a left-foot node of the effect editor in response to an operation of dragging the left-foot target file to the left-foot node, and configured to add a rendering component to a right-foot node of the effect editor in response to an operation of dragging the right-foot target file to the right-foot node.

Optionally, the apparatus further includes a second adding module configured to in response to the operation of dragging the target file to the preset node of the effect editor, add a position-posture component to the preset node and establish a reference relationship between the position-posture component and a preset foot-detection algorithm, so as to allow a foot position and a foot posture, which are determined based on the preset foot-detection algorithm, to be transferred to the position-posture component. The preset foot-detection algorithm is configured to determine the foot position and the foot posture based on a video frame, and the position-posture component is configured to provide a rendering position during rendering.

Optionally, the rendering module 530 is specifically configured to perform correction, based on a coordinate origin applied in the preset foot-detection algorithm, on a coordinate origin of a shoe model to adjust a fitness between the shoe model and a foot model.

Optionally, the apparatus further includes a third adding module configured to add a leg model to the preset node in response to the operation of dragging the target file to the preset node of the effect editor. The leg model is configured to provide an obscuring relationship during rendering.

Optionally, the apparatus further includes a generating module configured to generate, based on the preset node, a try-on effect file package, and the try-on effect file package includes at least one of following: a texture mapping sub-file of shoes, a model sub-file of shoes, a material resource file, a leg model, a rendering component, a position-posture component, or a reference relationship between the rendering component and respective files. The apparatus further includes an uploading module, configured to upload the try-on effect file package to a server, so as to allow the server to cooperate with a client terminal to achieve a virtual try-on function at the client terminal based on the try-on effect file package.

According to the data processing apparatus provided by the embodiments of the present disclosure, the user only needs to import the resource file of the object to be tried on to the effect editor, the effect editor may automatically perform parsing and format conversion on the resource file to obtain the target file adapted to the effect editor, then the user drags the target file to the preset node of the effect editor, and the effect editor may automatically add the rendering component for the preset node and render the try-on image in which the model of the object to be tried on is tried on the model of the preset part, thereby achieving the virtual try-on of the object to be tried on and simplifying the operation of the user.

The data processing apparatus provided by the embodiments of the present disclosure may perform the steps of the data processing method provided by the method embodiments of the present disclosure, and the specific performing steps and the beneficial effects are not repeatedly described here.

Figure 6:
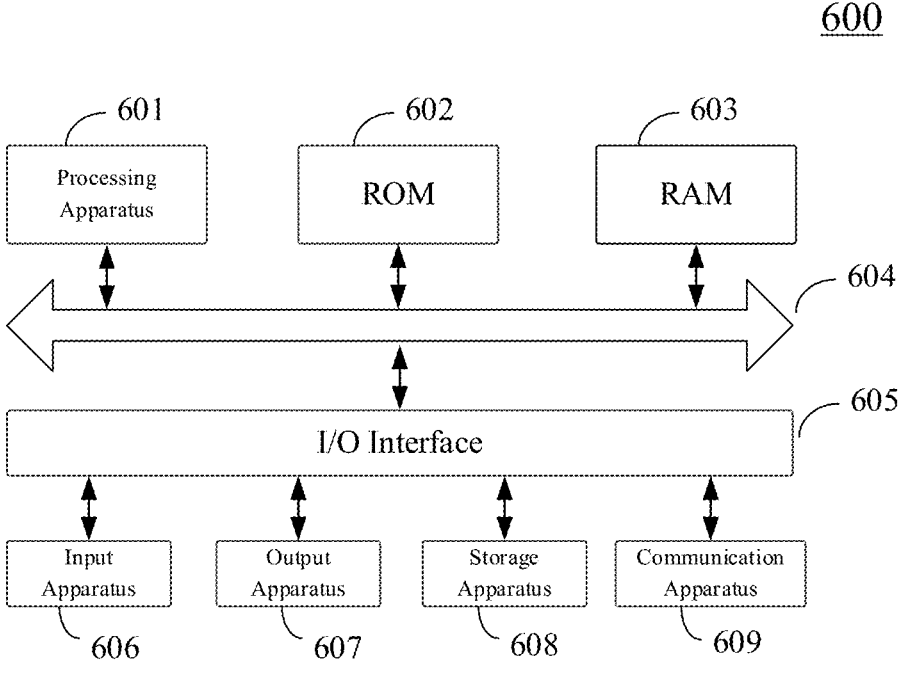
FIG. 6 is a schematic structural diagram of an electronic device according to an embodiment of the present disclosure.

FIG. 6 shows a schematic structural diagram of an electronic device provided by an embodiment of the present disclosure. In the following, specifically with reference to FIG. 6, FIG. 6 illustrates a schematic structural diagram suitable for implementing an electronic device 600 in the embodiments of the present disclosure. The electronic device 600 in the embodiments of the present disclosure may include but is not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable device, or the like, and fixed terminals such as a digital TV, a desktop computer, a smart home device, or the like. It should be noted that, the electronic device 600 illustrated in FIG. 6 is merely an example, and should not pose any limitation to the functions and the range of use of the embodiments of the present disclosure.

As illustrated in FIG. 6, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 600 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowchart may be implemented as a computer software program. For example, the embodiments of the present disclosure include a computer program product, which includes a computer program carried by a non-transitory computer-readable medium. The computer program includes program codes for performing the method shown in the flowchart. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the method provided by the embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to:

in response to an operation of importing a resource file of an object to be tried on, performing processing on the resource file and obtaining a target file in a file format adapted to an effect editor; adding a rendering component to a preset node of the effect editor in response to an operation of dragging the target file to the preset node; and rendering, based on the rendering component, a try-on image in which a model of the object to be tried on is tried on a model of a preset part.

Optionally, when the one or more programs are executed by the electronic device, the electronic device may also be caused to perform other steps as described in the above embodiments.

The computer program codes for performing the operations of the present disclosure may be written in one or more programming languages or a combination thereof. The above-described programming languages include but are not limited to object-oriented programming languages such as Java, Smalltalk, C++, and also include conventional procedural programming languages such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, a data processing method provided by the present disclosure includes: in response to an operation of importing a resource file of an object to be tried on, performing processing on the resource file and obtaining a target file in a file format adapted to an effect editor; adding a rendering component to a preset node of the effect editor in response to an operation of dragging the target file to the preset node; and rendering, based on the rendering component, a try-on image in which a model of the object to be tried on is tried on a model of a preset part.

According to one or more embodiments of the present disclosure, in the data processing method provided by the present disclosure, optionally, the resource file of the object to be tried on is a file in a three-dimensional (3D) format obtained by tracking a physical entity of the object to be tried on based on a 3D object tracking device.

According to one or more embodiments of the present disclosure, in the data processing method provided by the present disclosure, optionally, performing processing on the resource file and obtaining the target file in the file format adapted to the effect editor comprises: converting, based on a first preset file parsing-program-table interface, the file format of the resource file to a first format and obtaining the resource file in the first format; parsing, based on a second preset file parsing-program-table interface, the resource file in the first format and obtaining at least two key points of a resource object included in the resource file in the first format; and generating, based on the at least two key points, the target file in the file format adapted to the effect editor, the target file comprising a texture mapping sub-file of the object to be tried on and a model sub-file of the object to be tried on.

According to one or more embodiments of the present disclosure, in the data processing method provided by the present disclosure, optionally, adding the rendering component to the preset node of the effect editor in response to the operation of dragging the target file to the preset node comprises: loading the rendering component, which is already set, to the preset node and passing the model sub-file into the rendering component, so as to establish a reference relationship between the rendering component and the model sub-file; creating a sub-node of a preset material resource file and establishing a reference relationship between the preset material resource file and the rendering component; and establishing a reference relationship between the texture mapping sub-file and the preset material resource file in response to an operation of dragging the texture mapping sub-file to the sub-node of the preset material resource file.

According to one or more embodiments of the present disclosure, in the data processing method provided by the present disclosure, optionally, the object to be tried on comprises shoes, and the model of the object to be tried on comprises a left-foot shoe model and a right-foot shoe model, and the model of the preset part comprises a left-foot foot model and a right-foot foot model; and the resource file comprises a left-foot resource file and a right-foot resource file, and the target file comprises a left-foot target file and a right-foot target file.

According to one or more embodiments of the present disclosure, in the data processing method provided by the present disclosure, optionally, adding the rendering component to the preset node of the effect editor in response to the operation of dragging the target file to the preset node comprises: adding a rendering component to a left-foot node of the effect editor in response to an operation of dragging the left-foot target file to the left-foot node; and adding a rendering component to a right-foot node of the effect editor in response to an operation of dragging the right-foot target file to the right-foot node.

According to one or more embodiments of the present disclosure, in the data processing method provided by the present disclosure, optionally, the method further includes: in response to the operation of dragging the target file to the preset node of the effect editor, adding a position-posture component to the preset node and establishing a reference relationship between the position-posture component and a preset foot-detection algorithm, so as to allow a foot position and a foot posture, which are determined based on the preset foot-detection algorithm, to be transferred to the position-posture component, where the preset foot-detection algorithm is configured to determine the foot position and the foot posture based on a video frame, and the position-posture component is configured to provide a rendering position during rendering.

According to one or more embodiments of the present disclosure, in the data processing method provided by the present disclosure, optionally, rendering, based on the rendering component, the try-on image in which the model of the object to be tried on is tried on the model of the preset part comprises: performing correction, based on a coordinate origin applied in the preset foot-detection algorithm, on a coordinate origin of a shoe model to adjust a fitness between the shoe model and a foot model.

According to one or more embodiments of the present disclosure, in the data processing method provided by the present disclosure, optionally, the method further includes: adding a leg model to the preset node in response to the operation of dragging the target file to the preset node of the effect editor, wherein the leg model is configured to provide an obscuring relationship during rendering.

According to one or more embodiments of the present disclosure, in the data processing method provided by the present disclosure, optionally, the method further includes: generating, based on the preset node, a try-on effect file package, wherein the try-on effect file package comprises at least one of following: a texture mapping sub-file of shoes, a model sub-file of shoes, a material resource file, a leg model, a rendering component, a position-posture component, or a reference relationship between the rendering component and respective files; and uploading the try-on effect file package to a server, so as to allow the server to cooperate with a client terminal to achieve a virtual try-on function at the client terminal based on the try-on effect file package.

According to one or more embodiments of the present disclosure, the data processing apparatus provided by the present disclosure includes: a processing module, configured to, in response to an operation of importing a resource file of an object to be tried on, perform processing on the resource file and obtain a target file in a file format adapted to an effect editor; a first adding module, configured to add a rendering component to a preset node of the effect editor in response to an operation of dragging the target file to the preset node; and a rendering module, configured to render, based on the rendering component, a try-on image in which a model of the object to be tried on is tried on a model of a preset part.

According to one or more embodiments of the present disclosure, in the data processing apparatus provided by the present disclosure, optionally, the resource file of the object to be tried on is a file in a three-dimensional (3D) format obtained by tracking a physical entity of the object to be tried on based on a 3D object tracking device.

According to one or more embodiments of the present disclosure, in the data processing apparatus provided by the present disclosure, optionally, the processing module includes: a conversion unit, configured to convert, based on a first preset file parsing-program-table interface, the file format of the resource file to a first format and obtain the resource file in the first format; a parsing unit, configured to parse, based on a second preset file parsing-program-table interface, the resource file in the first format and obtain at least two key points of a resource object included in the resource file in the first format; and a generating unit, configured to generate, based on the at least two key points, the target file in the file format adapted to the effect editor, the target file including a texture mapping sub-file of the object to be tried on and a model sub-file of the object to be tried on.

According to one or more embodiments of the present disclosure, in the data processing apparatus provided by the present disclosure, optionally, the first adding module includes: a loading unit, configured to load the rendering component, which is already set, to the preset node and pass the model sub-file into the rendering component, so as to establish a reference relationship between the rendering component and the model sub-file; a creating unit, configured to create a sub-node of a preset material resource file and establish a reference relationship between the preset material resource file and the rendering component; and an establishing unit, configured to establish a reference relationship between the texture mapping sub-file and the preset material resource file in response to an operation of dragging the texture mapping sub-file to the sub-node of the preset material resource file.

According to one or more embodiments of the present disclosure, in the data processing apparatus provided by the present disclosure, optionally, the object to be tried on includes shoes, and the model of the object to be tried on includes a left-foot shoe model and a right-foot shoe model, and the model of the preset part includes a left-foot foot model and a right-foot foot model; and the resource file includes a left-foot resource file and a right-foot resource file, and the target file includes a left-foot target file and a right-foot target file.

According to one or more embodiments of the present disclosure, in the data processing apparatus provided by the present disclosure, optionally, the first adding module is specifically configured to add a rendering component to a left-foot node of the effect editor in response to an operation of dragging the left-foot target file to the left-foot node, and configured to add a rendering component to a right-foot node of the effect editor in response to an operation of dragging the right-foot target file to the right-foot node.

According to one or more embodiments of the present disclosure, in the data processing apparatus provided by the present disclosure, optionally, the apparatus further includes a second adding module configured to in response to the operation of dragging the target file to the preset node of the effect editor, add a position-posture component to the preset node and establish a reference relationship between the position-posture component and a preset foot-detection algorithm, so as to allow a foot position and a foot posture, which are determined based on the preset foot-detection algorithm, to be transferred to the position-posture component. The preset foot-detection algorithm is configured to determine the foot position and the foot posture based on a video frame, and the position-posture component is configured to provide a rendering position during rendering.

According to one or more embodiments of the present disclosure, in the data processing apparatus provided by the present disclosure, optionally, the rendering module is specifically configured to perform correction, based on a coordinate origin applied in the preset foot-detection algorithm, on a coordinate origin of a shoe model to adjust a fitness between the shoe model and a foot model.

According to one or more embodiments of the present disclosure, in the data processing apparatus provided by the present disclosure, optionally, the apparatus further includes a third adding module configured to add a leg model to the preset node in response to the operation of dragging the target file to the preset node of the effect editor. The leg model is configured to provide an obscuring relationship during rendering.

According to one or more embodiments of the present disclosure, in the data processing apparatus provided by the present disclosure, optionally, the apparatus further includes a generating module configured to generate, based on the preset node, a try-on effect file package, and the try-on effect file package includes at least one of following: a texture mapping sub-file of shoes, a model sub-file of shoes, a material resource file, a leg model, a rendering component, a position-posture component, or a reference relationship between the rendering component and respective files. The apparatus further includes an uploading module, configured to upload the try-on effect file package to a server, so as to allow the server to cooperate with a client terminal to achieve a virtual try-on function at the client terminal based on the try-on effect file package.

According to one or more embodiments of the present disclosure, the present disclosure provides an electronic device, including:

one or more processors, and a storage apparatus for storing one or more programs; and the one or more programs, when executed by the one or more processors, cause the one or more processors to implement the data processing method according to any one of the embodiments of the present disclosure.

According to one or more embodiments of the present disclosure, the present disclosure provides a computer-readable storage medium storing a computer program, and the computer program, when executed by a processor, causes the processor to implement the data processing method according to any one of the embodiments of the present disclosure.

The embodiments of the present disclosure further provide a computer program product, the computer program product includes a computer program or instructions, and the computer program or instructions, when executed by a processor, implements the data processing method as described above.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate subcombination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

The invention claimed is:

1. A data processing method, comprising:
in response to an operation of importing a resource file of an object to be tried on, performing processing on the resource file and obtaining a target file in a file format adapted to an effect editor;
adding a rendering component to a preset node of the effect editor in response to an operation of dragging the target file to the preset node; and
rendering, based on the rendering component, a try-on image in which a model of the object to be tried on is tried on a model of a preset part.

2. The method according to claim 1, wherein the resource file of the object to be tried on is a file in a three-dimensional (3D) format obtained by tracking a physical entity of the object to be tried on based on a 3D object tracking device.

3. The method according to claim 1, wherein performing processing on the resource file and obtaining the target file in the file format adapted to the effect editor comprises:
converting, based on a first preset file parsing-program-table interface, the file format of the resource file to a first format and obtaining the resource file in the first format;
parsing, based on a second preset file parsing-program-table interface, the resource file in the first format and obtaining at least two key points of a resource object included in the resource file in the first format; and
generating, based on the at least two key points, the target file in the file format adapted to the effect editor, the target file comprising a texture mapping sub-file of the object to be tried on and a model sub-file of the object to be tried on.

4. The method according to claim 3, wherein adding the rendering component to the preset node of the effect editor in response to the operation of dragging the target file to the preset node comprises:

18 loading the rendering component, which is already set, to the preset node and passing the model sub-file into the rendering component, so as to establish a reference relationship between the rendering component and the model sub-file;
creating a sub-node of a preset material resource file and establishing a reference relationship between the preset material resource file and the rendering component; and
establishing a reference relationship between the texture mapping sub-file and the preset material resource file in response to an operation of dragging the texture mapping sub-file to the sub-node of the preset material resource file.

5. The method according to claim 1, wherein the object to be tried on comprises shoes, and the model of the object to be tried on comprises a left-foot shoe model and a right-foot shoe model, and the model of the preset part comprises a left-foot foot model and a right-foot foot model; and
the resource file comprises a left-foot resource file and a right-foot resource file, and the target file comprises a left-foot target file and a right-foot target file.

6. The method according to claim 5, wherein adding the rendering component to the preset node of the effect editor in response to the operation of dragging the target file to the preset node comprises:
adding a rendering component to a left-foot node of the effect editor in response to an operation of dragging the left-foot target file to the left-foot node; and
adding a rendering component to a right-foot node of the effect editor in response to an operation of dragging the right-foot target file to the right-foot node.

7. The method according to claim 5, further comprising:
in response to the operation of dragging the target file to the preset node of the effect editor, adding a position-posture component to the preset node and establishing a reference relationship between the position-posture component and a preset foot-detection algorithm, so as to allow a foot position and a foot posture, which are determined based on the preset foot-detection algorithm, to be transferred to the position-posture component,
wherein the preset foot-detection algorithm is configured to determine the foot position and the foot posture based on a video frame, and the position-posture component is configured to provide a rendering position during rendering.

8. The method according to claim 7, wherein rendering, based on the rendering component, the try-on image in which the model of the object to be tried on is tried on the model of the preset part comprises:
performing correction, based on a coordinate origin applied in the preset foot-detection algorithm, on a coordinate origin of a shoe model to adjust a fitness between the shoe model and a foot model.

9. The method according to claim 5, further comprising:
adding a leg model to the preset node in response to the operation of dragging the target file to the preset node of the effect editor, wherein the leg model is configured to provide an obscuring relationship during rendering.

10. The method according to claim 5, further comprising:
generating, based on the preset node, a try-on effect file package, wherein the try-on effect file package comprises at least one of following: a texture mapping sub-file of shoes, a model sub-file of shoes, a material resource file, a leg model, a rendering component, a position-posture component, or a reference relationship between the rendering component and respective files; and uploading the try-on effect file package to a server, so as to allow the server to cooperate with a client terminal to achieve a virtual try-on function at the client terminal based on the try-on effect file package.

11. An electronic device, comprising:

one or more processors; and a storage apparatus for storing one or more programs, wherein the one or more programs, when executed by the one or more processors, cause the one or more processors to implement the method according to claim 1.

12. A data processing apparatus, comprising:

a processing module, configured to, in response to an operation of importing a resource file of an object to be tried on, perform processing on the resource file and obtain a target file in a file format adapted to an effect editor;

a first adding module, configured to add a rendering component to a preset node of the effect editor in response to an operation of dragging the target file to the preset node; and a rendering module, configured to render, based on the rendering component, a try-on image in which a model of the object to be tried on is tried on a model of a preset part.

13. The apparatus according to claim 12, wherein the resource file of the object to be tried on is a file in a three-dimensional (3D) format obtained by tracking a physical entity of the object to be tried on based on a 3D object tracking device.

14. The apparatus according to claim 12, wherein the processing module comprises:

a conversion unit, configured to convert, based on a first preset file parsing-program-table interface, the file format of the resource file to a first format and obtain the resource file in the first format;

a parsing unit, configured to parse, based on a second preset file parsing-program-table interface, the resource file in the first format and obtain at least two key points of a resource object included in the resource file in the first format; and a generating unit, configured to generate, based on the at least two key points, the target file in the file format adapted to the effect editor, the target file comprising a texture mapping sub-file of the object to be tried on and a model sub-file of the object to be tried on.

15. The apparatus according to claim 14, wherein the first adding module comprises:

a loading unit, configured to load the rendering component, which is already set, to the preset node and pass the model sub-file into the rendering component, so as to establish a reference relationship between the rendering component and the model sub-file;

a creating unit, configured to create a sub-node of a preset material resource file and establish a reference relationship between the preset material resource file and the rendering component; and an establishing unit, configured to establish a reference relationship between the texture mapping sub-file and the preset material resource file in response to an operation of dragging the texture mapping sub-file to the sub-node of the preset material resource file.

16. The apparatus according to claim 12, wherein the object to be tried on comprises shoes, and the model of the object to be tried on comprises a left-foot shoe model and a right-foot shoe model, and the model of the preset part comprises a left-foot foot model and a right-foot foot model; and the resource file comprises a left-foot resource file and a right-foot resource file, and the target file comprises a left-foot target file and a right-foot target file.

17. The apparatus according to claim 16, wherein the first adding module is configured to:

add a rendering component to a left-foot node of the effect editor in response to an operation of dragging the left-foot target file to the left-foot node; and add a rendering component to a right-foot node of the effect editor in response to an operation of dragging the right-foot target file to the right-foot node.

18. The apparatus according to claim 16, further comprising:

a second adding module, configured to, in response to the operation of dragging the target file to the preset node of the effect editor, add a position-posture component to the preset node and establish a reference relationship between the position-posture component and a preset foot-detection algorithm, so as to allow a foot position and a foot posture, which are determined based on the preset foot-detection algorithm, to be transferred to the position-posture component, wherein the preset foot-detection algorithm is configured to determine the foot position and the foot posture based on a video frame, and the position-posture component is configured to provide a rendering position during rendering.

19. The apparatus according to claim 18, wherein the rendering module is configured to perform correction, based on a coordinate origin applied in the preset foot-detection algorithm, on a coordinate origin of a shoe model to adjust a fitness between the shoe model and a foot model.

20. A non-transitory computer-readable storage medium storing a computer program, wherein the computer program, when executed by a processor, causes the processor to implement a data processing method, and the data processing method comprises:

in response to an operation of importing a resource file of an object to be tried on, performing processing on the resource file and obtaining a target file in a file format adapted to an effect editor;

adding a rendering component to a preset node of the effect editor in response to an operation of dragging the target file to the preset node; and rendering, based on the rendering component, a try-on image in which a model of the object to be tried on is tried on a model of a preset part.

* * * * *